Patented May 1, 1928.

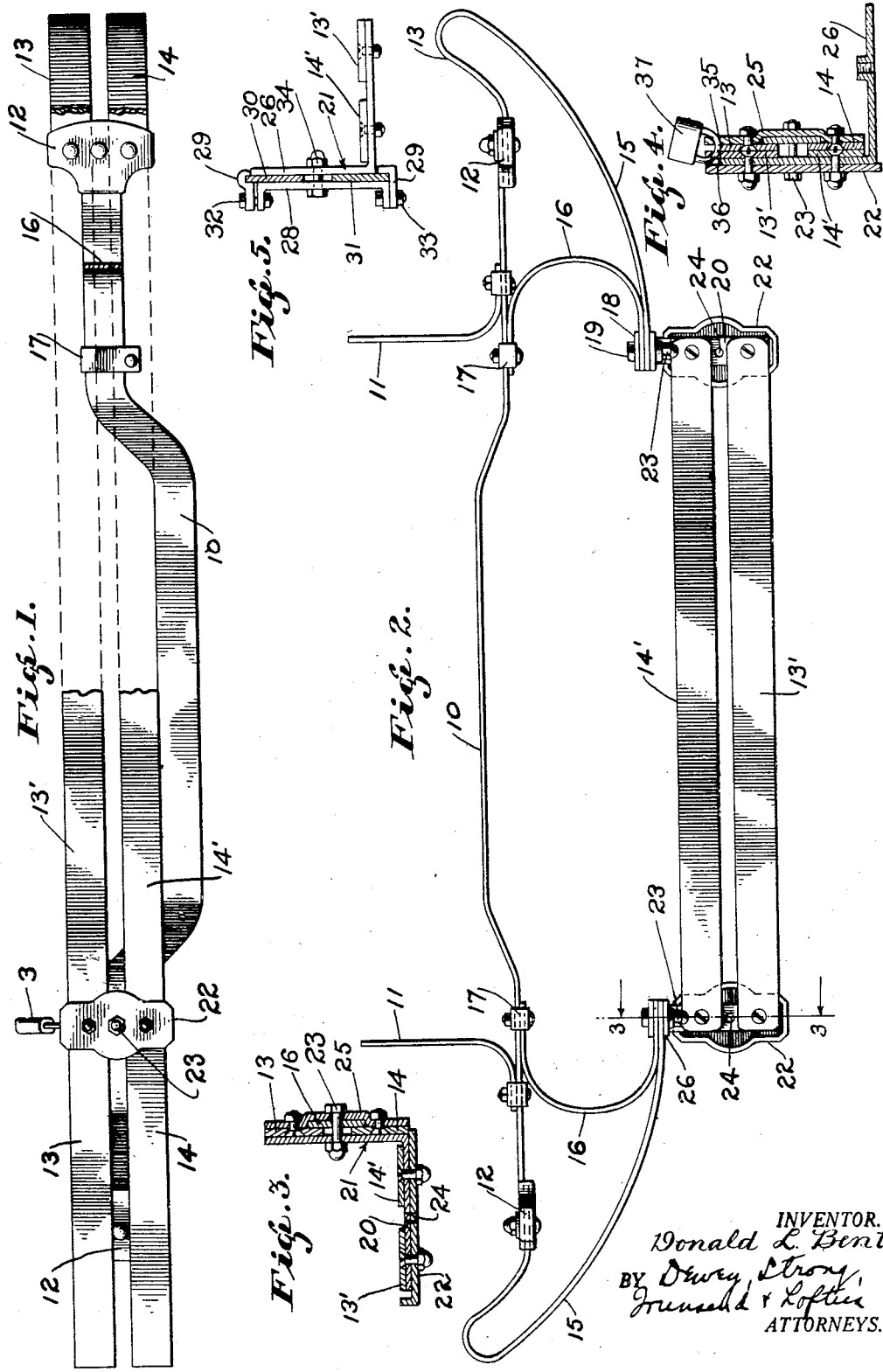

1,668,188

UNITED STATES PATENT OFFICE.

DONALD L. BENTON, OF LOS ANGELES, CALIFORNIA, ASSIGNOR TO AMERICAN CHAIN COMPANY, INC., OF BRIDGEPORT, CONNECTICUT, A CORPORATION OF NEW YORK.

CONVERTIBLE BUMPER AND LUGGAGE CARRIER.

Application filed August 9, 1926. Serial No. 128,085.

This invention relates to automobile bumpers and particularly pertains to an automobile bumper which may be readily manipulated to accommodate and carry luggage.

It is the principal object of the present invention to provide an automobile bumper which may be secured transversely of the end of an automobile while disposed in a horizontal plane and which has its bars so constructed and arranged as to permit manipulation of these parts to form an automobile bumper of the looped end spring bar type or to provide looped end bumper tips intermediate which a section of the impact bar may be disposed to receive and support luggage.

The present invention contemplates the use of a bumper structure having a transverse horizontal member carrying looped end bumper tips at its opposite ends, said tips being connected by a bumper impact section which when spanning the space therebetween forms a continuous looped end bumper and which will permit the spanning portion of the impact section to be moved to a position in a horizontal plane for the support of luggage and the like.

The invention is illustrated by way of example in the accompanying drawings, in which:

Fig. 1 is a view in front elevation showing the bumper structure with parts broken away for the sake of convenience and disclosing it as when assembled for use as a bumper only.

Fig. 2 is a view in plan showing the complete bumper with the movable impact section disposed in a position to support luggage and further indicating by dotted lines an enlarged rack by which the area of the supporting platform may be increased.

Fig. 3 is a view in vertical section through the bumper as seen on line 3—3 of Fig. 2 and showing the relative position of parts of the rigid bumper structure and the removable impact section when said removable impact section is in the position shown in Fig. 2.

Fig. 4 is a view in vertical section showing the relative position of the fixed and movable portions of the impact section when the structure is being used solely as a bumper.

Fig. 5 is a view in transverse section showing a modification of the invention whereby a luggage carrier platform may be secured to the usual type of bumper.

Referring more particularly to the drawings, 10 indicates a transverse back bar adapted to be secured to an automobile frame by suitable means such as the brackets 11. Secured at the ends of the back bar are connecting plates 12 by which the back bar is secured to parallel flat strip loop members 13 and 14. These loops are disposed in horizontal parallel planes as shown in Fig. 1, and extend outwardly from the connecting plates 12 and are then looped upon themselves and bent rearwardly and inwardly to form impact portions 15. These portions terminate substantially in alignment with the automobile frame and in spaced relation thereto. The free ends of the impact members 13 and 14 are yieldably tied to the back bar by an intermediate semi-circular flat spring 16 interposed between the free ends of the loop and the back bar and fastened to the back bar by clips 17. These springs are fastened to the free ends of the loops by a plate 18 and bolts 19.

By reference to Fig. 2 of the drawing, it will be seen that between the terminating ends of the impact loop sections there is a considerable distance. This distance is in fact great enough to permit a suitcase, small trunk or other similar piece of luggage to be disposed between the contiguous terminating ends of the loops. The span between these portions of the loops is usually closed by central impact bars 13' and 14' forming continuations of the loop portions 13 and 14 respectively. These impact bars are here shown as being straight and held in rigid parallel relation to each other by being secured to leg 20 of an angle plate 21. A finishing plate 22 is secured upon the outer face of the leg 20 of angle plate 21, as shown in Fig. 1 of the drawings. This plate will cover the joint between the central impact bar sections and the loop sections.

As shown in Fig. 4 of the drawing, a bolt 23 passes through an opening 24 in leg 20 of each angle and also between the bumper bars, as well as the end of spring members 16 and their fastening plate 25. This bolt normally holds the bars 13′ and 14′ in horizontal alignment with the respective loop bars 13 and 14.

Thus, when the bumper is assembled in this manner, there will be a continuous parallel bar impact section extending transversely of the car and terminating in resilient looped ends of flat spring construction. If, however, it is desirable to adapt the bumper for carrying luggage, bolts 23 may be removed to permit the impact members 13′ and 14′ to be disposed in alignment in the same horizontal plane as shown in Figs. 2 and 3. When this is done leg 26 of each of the angle members 21 will be disposed vertically and lying flush against the back faces of the respective loop bars 13 and 14. While in this position the angles may be fastened by bolts 23 as shown particularly in Fig. 3, thereby disposing and holding the bar sections 13′ and 14′ in an aligned and horizontal plane at right angles to their original plane as shown in Fig. 1 and at right angles to the constant vertical plane of the impact face of the loops 13 and 14.

In this position the luggage or other similar articles may be mounted upon the impact sections 13′ and 14′ and supported.

In the form of invention shown in Fig. 5, a structure is shown by which bars 13′ and 14′ with their angle mountings 21 may be secured to a parallel bar bumper formed of flat strip bars disposed edgewise in parallel vertical alignment. This structure comprises plates 28 having clip portions 29 and 30 at their opposite ends which hook over the outermost edges of bumper bars 30 and 31 and are clamped in this position by bolts 32 and 33. Bolts 34 pass over the plates 28 and engage the leg 26 of angle plates 21 in the same manner as previously described and shown in Fig. 3, thus providing a ledge upon which articles may be supported, the weight being disposed upon a bumper.

In order that the impact section bars 13′ and 14′ may be securely held in their upright position and to prevent the section from being taken away, the leg 20 of one of the angle members 21 is formed with an opening 35 near its end which substantially registers with an opennig 36 in the plate 22 and through which the bolt or hasp of a padlock 37 may pass to lock the removable member to the fixed portion of the bumper.

It will thus be seen that the structure here disclosed provides means whereby a complete resilient loop end spring bumper may be supported in a protecting position transversely of the end of an automobile and may be readily and conveniently adapted for use as a luggage carrier.

While I have shown the preferred form of my invention as now known to me, it is to be understood that various changes may be made in its construction without departing from the spirit of the appended claims.

Having thus described my invention, what I claim and desire to secure by Letters Patent is:

1. A combined automobile bumper and luggage carrier comprising a pair of looped end spring bumper tips, said tips being secured to the automobile frame to overhang opposite sides of the automobile body and being arranged so that there will be a space between the contiguous edges of the tips, a supplemental resilient impact structure normally secured to the tips and being in alignment with the impact face thereof to span the distance between the tips and combine therewith to form a continuous resilient automobile bumper, and means whereby said impact section may be moved to a position at right angles to the aforesaid position to form a platform between the tips and upon which luggage may be carried.

2. A combined automobile bumper and luggage carrier comprising bumper tips disposed in overhanging relation to the opposite sides of an automobile and secured to the automobile frame, each of said tips being formed of a plurality of flat strips of resilient material disposed one above the other in parallel relation and bent in loop fashion, means for mounting said tips upon the automobile frame, an intervening bumper section formed of a plurality of resilient bars lying in the same plane, means for securing said intervening bumper section to the tips in a manner to support said bumper section as a continuation of the impact surface of the bumper tips, and means for disposing said intervening impact section at right angles to its first mentioned position whereby its aligned parallel bars will lie in a horizontal plane and will be supported from the bumper tips in a manner to carry luggage and the like.

3. A combined automobile bumper and luggage carrier comprising a pair of looped bumper tips formed of flat resilient material, means for supporting said tips in position to overhang the sides of an automobile body and for mounting said tips upon the automobile frame, a flat intervening resilient bumper section bridging the distance between the two tips and forming a continuation of the impact surface thereof, and angle mounting brackets secured to the opposite ends of said impact section whereby the impact section may be fastened to the bumper tips in the same plane with the vertical impact face of the tips or in a position at right angles thereto.

4. A combined automobile bumper and trunk rack comprising a back bar, means for securing the same transversely of an automobile frame, a plurality of resilient looped bars formed of flat material and disposed in parallel vertical alignment, said looped bars being secured to the ends of the back bar by their bent ends, their opposite ends extending rearwardly and inwardly to terminate in longitudinal alignment and in spaced relation to each other, means for rigidly securing said superposed bars in fixed relation to each other, an intervening impact section adapted to span the distance between said ends of the looped bars, and means for supporting said impact section in longitudinal alignment with the looped bars or in a position at right angles thereto.

5. A combined automobile bumper and luggage carrier comprising a plurality of parallel transversely extending resilient bars, angle members disposed at the opposite ends of said bars, the bars being secured in spaced parallel relation to each other to one leg of each of the angle members, and a structure for supporting bars transversely of the rear of the vehicle and whereby the opposite legs of the angle members may be alternately secured to said supports to dispose the bars in a vertically aligned position while protecting the rear of the vehicle or in a horizontally aligned position to act as a luggage carrier.

6. A combined automobile bumper and luggage carrier comprising a plurality of parallel transversely extending resilient bars, angle members disposed at the opposite ends of said bars, the bars being secured in spaced parallel relation to each other to one leg of each of the angle members, a structure for supporting bars transversely of the rear of the vehicle and whereby the opposite legs of the angle member may be alternately secured to said supports to dispose the bars in a vertically aligned position while protecting the rear of the vehicle or in a horizontally aligned position to act as a luggage carrier, and horizontally resilient looped end bumper tips forming a part of said support and adapted to cooperate therewith when the bars are in their vertically aligned position to form a resilient bumper extending entirely across the end of the vehicle.

DONALD L. BENTON.